United States Patent Office 3,565,671
Patented Feb. 23, 1971

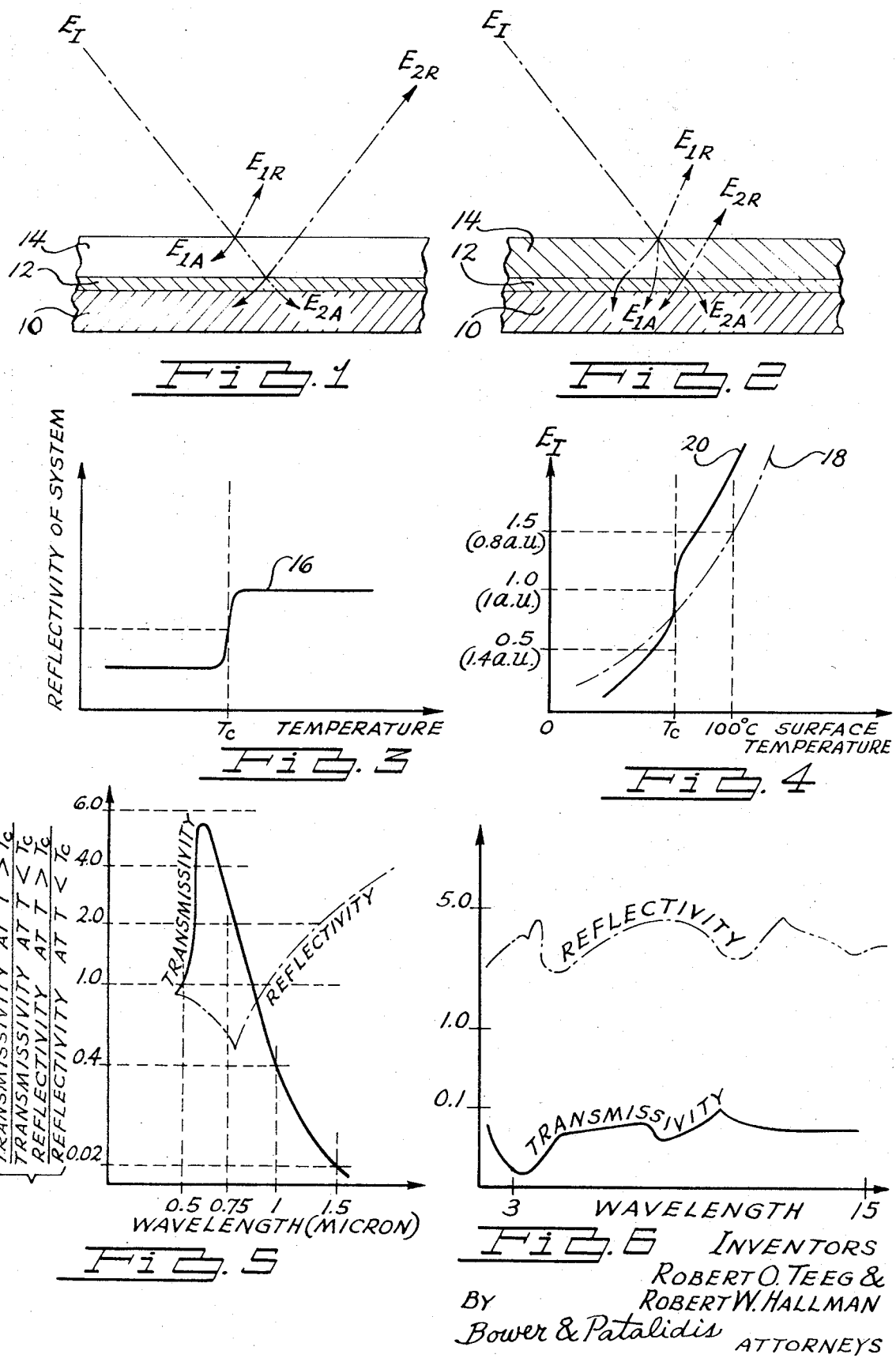

3,565,671
THERMAL CONTROL OF SPACECRAFT
AND THE LIKE
Robert O. Teeg, Grosse Pointe, and Robert W. Hallman,
Utica, Mich., assignors to Teeg Research, Inc., Detroit,
Mich., a corporation of Delaware
Continuation-in-part of application Ser. No. 471,580,
July 13, 1965. This application Aug. 22, 1968, Ser.
No. 769,772
Int. Cl. G02b 5/08
U.S. Cl. 117—71         9 Claims

ABSTRACT OF THE DISCLOSURE

A passive thermal control system for an enclosure such as a spacecraft or an artificial satellite comprising a surface coating of a material, such as vanadium dioxide, that exhibits a thermally induced change in radiation transmissivity at a predetermined temperature.

CROSS REFERENCE TO RELATED APPLICATIONS

The present application is a continuation-in-part of application Ser. No. 471,580, filed July 13, 1965 and now abandoned.

BACKGROUND OF THE INVENTION

The present invention relates generally to a thermal control system for a body, and more particularly to a thermal control system for a body in space such as a spacecraft or an artificial satellite.

The temperature within an artificial satellite must be controlled to meet the requirements of internal instrumentation, and the temperature within a spacecraft must be controlled to meet both the requirements of internal instrumentation and of man. Electrical, mechanical and optical instruments have thermally restricted operating ranges, usually from about 0° C. to 60° C. Structural alignment of optical systems, stability and lifetime of electronics equipment and integrity of mechanical components require substantially stable thermal environments, and living organisms demand reliable control of their environment temperature in a range of 20° C. to 40° C.

Prior and present art temperature control systems for spacecraft and artificial satellites belong to the general categories of active and passive systems.

Active systems involve the use of substantially complicated and delicate mechanisms such as shutters, refrigeration and thermostats. Although active systems offer a more precise control of environment temperature than passive systems, they have many undesirable features since they involve lower reliability and higher weight than passive systems. Consequently passive systems which utilize material having predetermined geometric and/or thermal properties are generally preferred.

Thermal control of spacecraft and artificial satellites by means of passive systems is accomplished by maintaining a proper balance between incident radiant energy absorbed by the outer wall or skin of the spacecraft or satellite and originating from radiant energy sources in space and the energy emitted from the spacecraft and the energy rejected into space. In other words, thermal balance requires:

E (emission)=E (internal)+E (absorption), where E (internal) is the heat generated by the equipment contained in the spacecraft or satellite, and E (absorption) is the energy absorbed by the spacecraft or satellite from radiant energy sources in space. Consequently the surface temperature of a body in space, spacecraft or satellite, is determined solely by the magnitude of the thermal input and by the emissivity of the outer or skin surface.

Most of the passive thermal control systems found in the prior art utilize surface coatings with substantially constant optical properties which, for the most part, are independent of the surface temperature or wavelength of incident radiant energy. This approach results in considerable difficulties for obtaining a particular ratio of absorbed radiant energy to emitted energy so as to provide an adequate thermal balance over a useful range of varying inputs.

Consequently, it is preferable to provide passive self-thermostatic control by means of a coating having optical properties varying distinctly with temperature. Many devices have been proposed, including Curie point transitions, color changing paints or fluids, dipole shutters and various optical devices. Most of these devices are unsatisfactory due to inherent instability, high hysteresis or to the fact that their effects are very small.

An ideal material for passive thermal control systems should fulfill the following requirements:
 (A) Engineering simplicity;
 (B) Constant control over large variations in incident radiant energy flux and internal heat generation for two spectral regions of primary interest (0.2 micron to 3.0 micron wavelengths, where 98% of the sun's energy is emitted, and 3.0 micron to the far infrared, peaking at about 9 microns, where 99% of the radiation from an object in space operating under temperature control is emitted);
 (C) Long life and low weight;
 (D) Total activation by known temperature changes;
 (E) Complete reversibility without assist;
 (F) Little or no latent heat;
 (G) No effective hysteresis;
 (H) No deleterious changes due to compression, vacuum or expansion;
 (I) Unlimited cycling capacity;
 (J) High environmental stability.

SUMMARY OF THE INVENTION

The present invention provides a surface coating for a body in space, spacecraft or artificial satellite, consisting of an inherently stable inorganic material exhibiting a thermally-induced color variation resulting in substantial change in its incident radiant energy transmissivity, and whch is endowed with inherent qualities fulfilling the hereinbefore enumerated requirements. The invention utilizes vanadium dioxide which has temperature dependent optical properties, thus providing a self-thermostatic surface for a body in space which, because of changes in transmissivity, emissivity and reflectivity of vanadium dioxide at the transition point, results in a control temperature varying little from a "set" temperature of 65° C., even in the presence of widely varying thermal inputs. Briefly stated, the vanadium dioxide color change at the transition temperature, 65° C., causes an increase in system reflectance with increasing temperature and a decrease in system reflectance with decreasing temperature.

The principal object of the invention, therefore, is to provide a passive self-thermostatic surface coating for an enclosure, more particularly for a body in space, spacecraft or artificial satellite, so as to provide in turn a substantially regulated and constant temperature within the enclosure.

Other objects and advantages of the invention will become apparent when the following description is considered in connection with the accompanying drawings wherein:

BRIEF DESCRIPTION OF THE DRAWINGS

FIG. 1 is a schematic representation of a thermostatic surface according to the principle of the invention for the purpose of explaining the operation of the invention when the surface temperature is above the transition temperature of the color changing surface coating;

FIG. 2 is a figure similar to FIG. 1, but showing the operation of the invention when the surface temperature is below the transition temperature of the color changing surface coating;

FIG. 3 is a graph showing the radiation reflectivity characteristics of a thermal control system according to the invention;

FIG. 4 is a graph showing the improvement of the temperature control of an object provided with the passive system of the invention as compared with an object not provided therewith;

FIG. 5 is a graph showing the variation of relative transmissivity and reflectivity of vanadium dioxide as a function of the wavelength of incident radiant energy, in the 0.4 to 1.5 micron wavelengths region of the spectrum.

FIG. 6 is a graph showing the variation of relative transmissivity and reflectivity of vanadium dioxide as a function of the wavelength of incident radiant energy, in the 3 to 15 micron wavelength region of the spectrum.

DETAILED DESCRIPTION OF THE PREFERRED EMBODIMENTS

Referring to the drawings, and more particularly to FIG. 1 thereof, the present invention consists in a coating for a body outer surface or skin 10 which comprises a first inner coating 12 of a polished highly reflective metal such as magnesium, aluminum or silver, and a second outer coating 14 of a material such as vanadium dioxide having the property of changing color, i.e. transmissivity of incident radiant energy, when heated to a transition temperature $Tc$.

The transition temperature of vanadium dioxide is generally in the neighborhood of 65° C., although it has been shown that by isomorphic substitution of various metal oxides, the transition temperature of vanadium dioxide can be shifted downwardly by as much as 20° C. without appreciable effect on the magnitude of change in susceptibility (Ariya, S. M., Grossman, G., Fizika Tverdogo Tela 2 6, 1283 (June 1960)).

The highly reflective metal coating 12 is deposited on the outer surface skin 10 of the body by way of any well known conventional methods such as plasma flame spraying, vacuum deposition or the like. Alternately, when the body outer surface is made of a metal such as aluminum or magnesium, the outer surface of such metal may be polished to a mirror finish so as to provide a high degree of reflectivity, and thus defining the highly reflective metal coating 12. The second outer coating 14, which is preferably made of vanadium dioxide, is then in turn deposited upon the highly reflective surface, preferably also by vacuum deposition according to the methods disclosed in detail in copending application Ser. No. 358,065, filed Apr. 7, 1964, now Pat. No. 3,455,724 issued July 15, 1969. According to one of such methods, a thin coating of vanadium pentoxide is vacuum deposited on the reflective metal coating 12 by evaporating vanadium pentoxide at a temperature of 500° C. to 850° C. under a pressure in the range of $10^{-4}$ mm. Hg to $10^{-6}$ mm. Hg, condensating a thin coating of vanadium pentoxide on the metal coating 12 and subsequently reducing the coating to vanadium dioxide by heating at a temperature of 400° C. to 600° C. under a pressure in the range of $10^{-1}$ to $10^{-4}$ mm. Hg in the presence of an appropriate stoichiometric amount of vanadium sesquioxide. Alternately the coating of vanadium pentoxide may be reduced to vanadium dioxide by heating under a pressure of $10^{-1}$ mm. Hg to $10^{-4}$ mm. Hg and continuously evacuating the oxygen given up by the vanadium pentoxide when heated under such conditions of reduced atmospheric pressure. As a further alternate process, a vanadium metal coating or vanadium lower oxide coating is vacuum deposited upon the reflective metal coating, vanadium metal requiring a temperature of vaporization of 1700° C. to 2000° C., under a pressure of $10^{-4}$ mm. Hg to $10^{-6}$ mm. Hg. The vanadium metal or vanadium lower oxide coating is then oxidized to vanadium dioxide by being heated at a temperature of about 550° C. in an atmosphere of oxygen at a pressure equal to the equilibrium vapor pressure of oxygen above vanadium suboxide, about $10^{-1}$ mm. Hg.

As a further alternate process, vanadium dioxide powder may be used as a pigment in a suitable vehicle such as a lacquer or resin for painting by brushing or spraying the outer surface of the body reflective metal coating 12, so as to form the vanadium dioxide coating 14. The vanadium dioxide power or crystals may be obtained by any one of the processes disclosed in copending application No. 447,546, filed Apr. 12, 1965, consisting in heating vanadium pentoxide in bulk form at a temperature in the range of 400° C. to 600° C. under a pressure in the range of $10^{-1}$ mm. Hg to $10^{-4}$ mm. Hg in the presence of a stoichiometric amount of vanadium sesquioxide or, alternately, while continuously evacuating the oxygen given up by the vanadium pentoxide when heated under such conditions.

FIG. 1 schematically represents typical conditions wherein the surface temperature of the body is above the transition temperature $Tc$ of the second outer coating 14. Consequently, the coating 14 has a highly increased transmissivity as compared to its transmissivity below the transition temperature $Tc$, and has also a greatly reduced reflectivity as compared to its reflectivity below the transition temperature, as shown by the graph of FIG. 5 which represents the variation of vanadium dioxide relative transmissivity, i.e. the ratio of $$\frac{\text{Transmissivity at temperature} > Tc}{\text{Transmissivity at temperature} < Tc}$$

and relative reflectivity, i.e. the ratio of $$\frac{\text{Reflectivity at temperature} > Tc}{\text{Reflectivity at temperature} < Tc}$$

in the wavelength region between about 0.4 and 1 micron, i.e. in the wavelength region where most of the sun's energy is emitted, 70% of the total solar radiant energy flux being emitted in the 0.4 to 1.0 micron region only.

In view of its high relative transmissivity above its transition temperature $Tc$, the second outer coating 14, as illustrated in FIG. 1 permits most of the incident radiant energy $E_I$ to penetrate unto the highly reflective inner second coating 12, from which most of the incident energy is reflected as represented by vector $E_{2R}$. A small amount of energy $E_{1A}$ is reflected by the second coating 14 and a small amount of energy $E_{1A}$ is absorbed. Also a small amount of energy $E_{2A}$ is absorbed by the reflective first coating 12, due to the fact that it is impractical to obtain a reflective coating endowed with a perfectly reflective surface having 100% reflectivity. Consequently, when the surface temperature of the body is above the transition temperature $Tc$ of the second coating 14, most of the incident radiant energy $E_I$ impinging upon the body is radiated back into space.

When the surface temperature of the body is below the transition temperature $Tc$ of the second coating 14, as shown in FIG. 2, the transmissivity of the second coating 14 is considerably reduced, thus preventing most of the incident radiant energy $E_I$ from penetrating through the coating 14 to the first inner reflective coating 12, with the result that only a negligible amount of radiant energy $E_{1R}$ and $E_{2R}$ is radiated back into space by the surfaces of the second coating 14 and of the first coating 12, respectively. Most of the incident radiant energy $E_I$ is absorbed by the second coating 14, and the energy $E_{1A}$ is transmitted by conduction to the surface skin 10 of the body, thus causing an increase of temperature of that surface skin and of the interior of the body. A small amount of energy $E_{2A}$ is also absorbed by the first inner coating 12, due to a small fraction of the incident energy $E_I$ reaching the surface of the first coating 12, although most of that energy, as previously explained, is partly reflected back into space, as represented by vector $E_{2R}$. However, some of the energy reflected by the surface of the first coating 12 is of course absorbed by the second coating 14 in view of its relative low transmissivity and has an added effect to the total amount of energy absorbed by the system.

As shown by curve 16 of the graph of FIG. 3, the change of relative transmissivity of the second coating 14 at the transition temperature Tc causes the reflectivity of the system to vary abruptly from a substantially constant value, below the transition temperature region where the reflectivity of the system is substantially low, to a substantially high reflectivity when the temperature rises above the transition temperature.

In solar orbits where the body in space is subjected mostly to incident radiant energy emitted from the sun, this solar flux energy being $E_o = 14 \times 10^{-2}$ watts cm.$^{-2}$ at 1 A.U., and where the thermal flux from a nearby planet is partically negligible, the surface temperature T of the body is obtained from the following equation:

$$T^4 = \frac{Pi + KE\sigma(1 - e^{\alpha x})}{\epsilon \sigma}$$

where:
$\epsilon = 1 \; (-\alpha x) = 0.69$;
$Pi = 10^{-4}$ watts cm.$^{-2}$ (assumed);
K is equivalent fraction of solar flux for normal incidence at 1 A.U., in other words, a correction factor for distance and incidence;
$\sigma$ = Stefan-Boltzman constant = $5.67 \times 10^{-12}$ watts cm.$^{-2}$ ° K.$^{-4}$, ° K. being expressed in degrees Kelvin; and
$a$ = absorptivity of outer coating 14; and
$x$ = thickness of outer coating 14 expressed in microns.

As shown in FIG. 4 the surface temperature of an uncoated body in space normally increases in function of the intensity of the radiant energy $E_I$ striking the surface of the body, resulting in a temperature curve such as curve 18 for the solar system, with the incident energy, and consequently the resulting surface temperature of the body, increasing proportionally to the decrease of distance between the body and the sun. With a passive thermal control system, utilizing a film of vanadium dioxide 14, which may be as thin as less than 1 micron and as thick as 1,000 microns, on a highly polished reflective substrate 12 of magnesium, aluminum, or silver, the variation of skin temperature of the body is substantially regulated within a certain range around the transition temperature Tc of vanadium dioxide (65° C.) for a substantial variation of the distance between the energy emitting body, the sun, and the body in space; as represented by temperature curve 20. It can also be seen that, in addition, for a given amount of incident radiant energy resulting in a certain temperature of the surface of an uncoated body below the transition temperature Tc, the temperature of a coated body is generally higher or at least equal. In temperature ranges above the transition temperature Tc, the body surface temperature is considerably lower when provided with a surface coating according to the invention than it would be without coating.

As shown in FIG. 6, above about 1 micron and more particularly in the 3 to 15 microns wavelength region of the spectrum, the relative reflectivity of vanadium dioxide is substantially high, while the relative transmissivity is substantially low. Consequently, when a body coated according to the invention is placed in a planetary orbit such as, for example, a Venus orbit where it is subjected, in addition to solar radiant energy flux, to planetary radiant energy flux in the infrared portion of the spectrum, effective thermal control of the body may still be obtained, as a result of a net positive effect from two opposite actions when the coating of vanadium dioxide is substantially thin.

In part of the infrared region of the spectrum, an outer second coating (FIGS. 1 and 2) made of a vanadium dioxide thin film is endowed with characteristics exactly opposed to its characteristics in the 0.4 to 1 micron region of the spectrum, so that when the vanadium dioxide film temperature is above its transition temperature Tc, its transmissivity decreases and its reflectivity increases so that the net radiant energy reflected into space by the second coating 14 is greater than when the vanadium dioxide film temperature is below the transition temperature. When the vanadium dioxide film temperature is below the transition temperature, its transmissivity is greatly increased and its reflectivity is greatly reduced. However, the net radiant energy reflected into space by the reflective first coating 12 is greater than the radiant energy absorbed by both coatings 12 and 14. Consequently, the thermal control system of the invention behaves as an effective filter rejecting into space a great proportion of the incident radiant enery of wavelengths comprised between 3 and 15 microns irrespective of whether the outer second coating 14 is "hot" or "cold" while, at the same time, continuing to provide effective thermal control of the coated body according to the principle hereinbefore explained relatively to radiant energy of wavelengths between 0.4 and 1.0 micron (solar radiant energy).

It will be obvious to those skilled in the art that many modifications may be made within the scope and spirit of the invention.

What is claimed is:

1. In a body having an outer surface exposed to varying amounts of incident radiant energy having a wavelength substantially between about 0.4 and 1 micron, a variable reflectance coating provided on said outer surface, said variable reflectance coating comprising in combination a substantially highly reflective metallic layer disposed on said outer surface provided in turn with a surface film consisting essentially of vanadium dioxide, said surface film being substantially transmissive of said incident radiant energy when at a temperature above a transition temperature and being subject to a substantially sudden drop in energy transmissivity when cooled below said transition temperature, whereby the temperature within said body is maintained within a desired temperature range.

2. The combination of claim 1 wherein the film of vanadium dioxide has a thickness of less than 1,000 microns.

3. The combination of claim 1 wherein the metallic layer is made of a metal selected from the group consisting of magnesium, aluminum and silver.

4. In a body having an outer surface exposed to varying amounts of incident radiant energy having a wavelength of about 1 micron to about 15 microns, an energy rejecting coating provided on said outer surface, said energy rejecting coating comprising in combination a substantially highly reflective metallic layer disposed on said outer surface and a surface film on said metallic layer of a material consisting essentially of vanadium dioxide, said surface film being substantially reflective of said incident radiant energy when at a temperature above a transition temperature and being subject to a substantially sudden decrease in energy reflectivity and increase in energy transmissivity when cooled below said transition temperature so that a substantial amount of said incident radiant energy is reflected by said reflective substrate at a temperature below said transition temperature, whereby the temperature within said body is maintained within a desired temperature range.

5. The combination of claim 4 wherein the film of vanadium dioxide has a thickness of less than 1,000 microns.

6. The combination of claim 4 wherein the metallic layer is made of a metal selected from the group consisting of magnesium, aluminum and silver.

7. In a body having an outer surface exposed to varying amounts of incident radiant energy having a wavelength substantially between about 0.4 and 15 microns, a variable reflectance coating provided on said outer surface, said variable reflectance coating comprising in combination a substantially highly reflective metallic layer disposed on said body outer surface and a surface film on said metallic layer of a material consisting essentially of vanadium dioxide, said surface film being substantially transmissive of said incident radiant energy of wavelength from 0.4 to 1 micron when at a temperature above a transition temperature and being subject to a substantially sudden drop in energy transmissivity when cooled below said transition temperature, said surface film being further substantially reflective of incident radiant energy of wavelength greater than 1 micron when at a temperature above said transition temperature and substantially transmissive of said radiant energy of wavelength greater than 1 micron when at a temperature below said transition temperature, whereby the temperature within said body is maintained within a desired temperature range.

8. The combination of claim 7 wherein the film of vanadium dioxide has a thickness of less than 1,000 microns.

9. The combination of claim 7 wherein the metallic layer is made of a metal selected from the group consisting of magnesium, aluminum and silver.

References Cited
UNITED STATES PATENTS
3,087,831  4/1963  Browne _____ 117—35S

OTHER REFERENCES

S. Westman, Phase Transition in $VO_2$ In Acta Chem. Scand., vol. 15, No. 1, 1961, p. 217.

S. Marks, Text-Book of Inorganic Chemistry, ed. by J. N. Friend, vol. VI, Part III, Charles Griffin & Co. Ltd., London, 1929, pp. 49, 50, 99.

ALFRED L. LEAVITT, Primary Examiner

C. K. WEIFFENBACH, Assistant Examiner

U.S. Cl. X.R.

117—35, 106, 160, 169

PO-1050
(5/69)

UNITED STATES PATENT OFFICE
CERTIFICATE OF CORRECTION

TRI-106-A-1

Patent No. __3,565,671__                  Dated __February 23, 1971__

Inventor(s) __ROBERT O. TEEG ET AL__

It is certified that error appears in the above-identified patent and that said Letters Patent are hereby corrected as shown below:

IN THE SPECIFICATION

Column 2, line 42, change "whch" to -- which --

Column 5, line 20, correct the member "$E_o$" to

-- $E_O$ --

Signed and sealed this 18th day of May 1971.

(SEAL)
Attest:

EDWARD M. FLETCHER, JR.
Attesting Officer

WILLIAM E. SCHUYLER, JR
Commissioner of Patents